United States Patent [19]
Tono et al.

[11] Patent Number: 5,394,055
[45] Date of Patent: Feb. 28, 1995

[54] COLOR PICTURE TUBE WITH THE FLUORESCENT FILM OF THE RED EMISSION COMPONENT HAVING A MIXTURE OF EUROPIUM ACTIVATED RARE EARTH OXIDE PHOSPHORS

[75] Inventors: Hideo Tono, Odawara; Masaru Naito, Isehara, both of Japan

[73] Assignee: Kasei Optonix, Tokyo, Japan

[21] Appl. No.: 946,453

[22] PCT Filed: Mar. 13, 1992

[86] PCT No.: PCT/JP92/00309

§ 371 Date: Nov. 16, 1992

§ 102(e) Date: Nov. 16, 1992

[87] PCT Pub. No.: WO92/16598

PCT Pub. Date: Oct. 1, 1992

[30] Foreign Application Priority Data

Mar. 14, 1991 [JP] Japan .................. 3-049683

[51] Int. Cl.⁶ .................. H01J 29/20; C09K 11/08
[52] U.S. Cl. .................. 313/467; 313/468; 252/301.4 R; 252/301.4 S
[58] Field of Search .......... 313/467, 468, 485, 486, 313/487; 252/301.4 R, 301.4 S; 427/64

[56] References Cited

U.S. PATENT DOCUMENTS 5,126,627  1/1992  Itou et al. .................. 313/478

FOREIGN PATENT DOCUMENTS 2266950 10/1975 France .
2850081  5/1980 Germany .
 513775  1/1976 Japan .
52-19187  2/1977 Japan .
53-14177  2/1978 Japan .
53-132255 11/1978 Japan .
1139686  6/1989 Japan .

OTHER PUBLICATIONS

Database WPIL, Section Ch, Week 34, Derwent Publications Ltd., London, AN 90-256511, JPA-2178387 (Toshiba Denshi) 11 Jul. 1990; abstract.
Database WPIL, Section Ch, Week 20, Derwent Publications Ltd., London; AN 81-35087D, JPA-56030487 (Kasei Optonix) 27 Mar. 1981; abstract.
Database WPI, Section Ch, Week 2, Derwent Publications Ltd., London; AN 79-03110B, JPA-53137087 (Tokyo Shibaura) 30 Nov. 1978; abstract.

*Primary Examiner*—Donald J. Yusko
*Assistant Examiner*—N. D. Patel
*Attorney, Agent, or Firm*—Wenderoth, Lind & Ponack

[57] ABSTRACT

The object of the present invention is to provide a color picture tube, which has a fluorescent film of a red emission component exhibiting a red emission with a deep color tone and is excellent in emission brightness. This object can effectively be accomplished by a color picture tube, having a face plate on which dot-shaped or stripe-shaped fluorescent films of blue, green and red emission components are respectively formed, characterized in that the fluorescent film of the red emission component is formed of a red emission composition comprising a mixture of an europium activated rare earth element oxide phosphor having an x value of 0.630 to 0.652 in CIE Chromaticity Representation and an europium activated rare earth element oxysulfide phosphor having an x value of 0.652 to 0.674 in CIE Chromaticity Representation, the red composition having an x of 0.647 to 0.662 in CIE Chromaticity Representation.

14 Claims, 7 Drawing Sheets

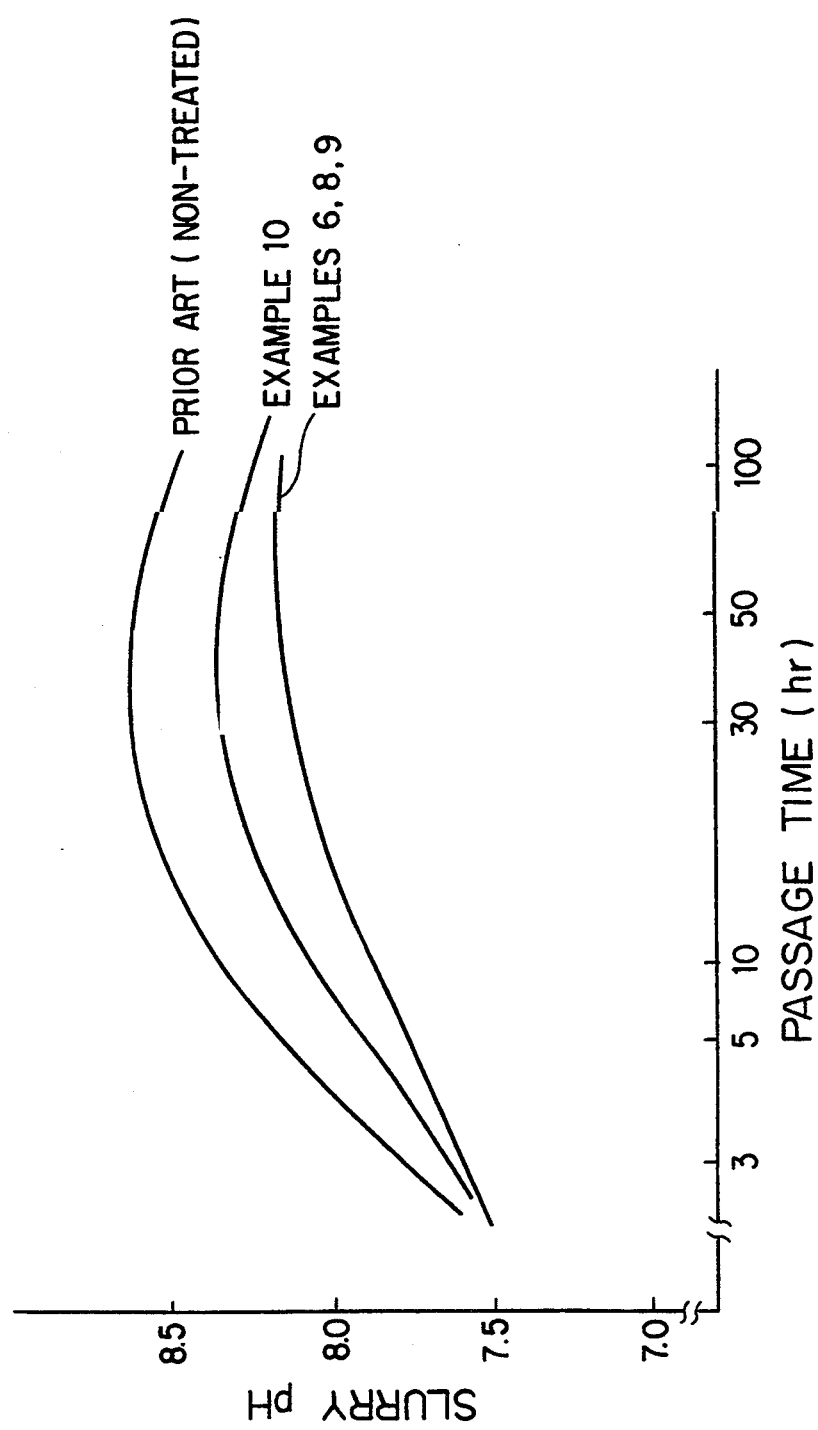

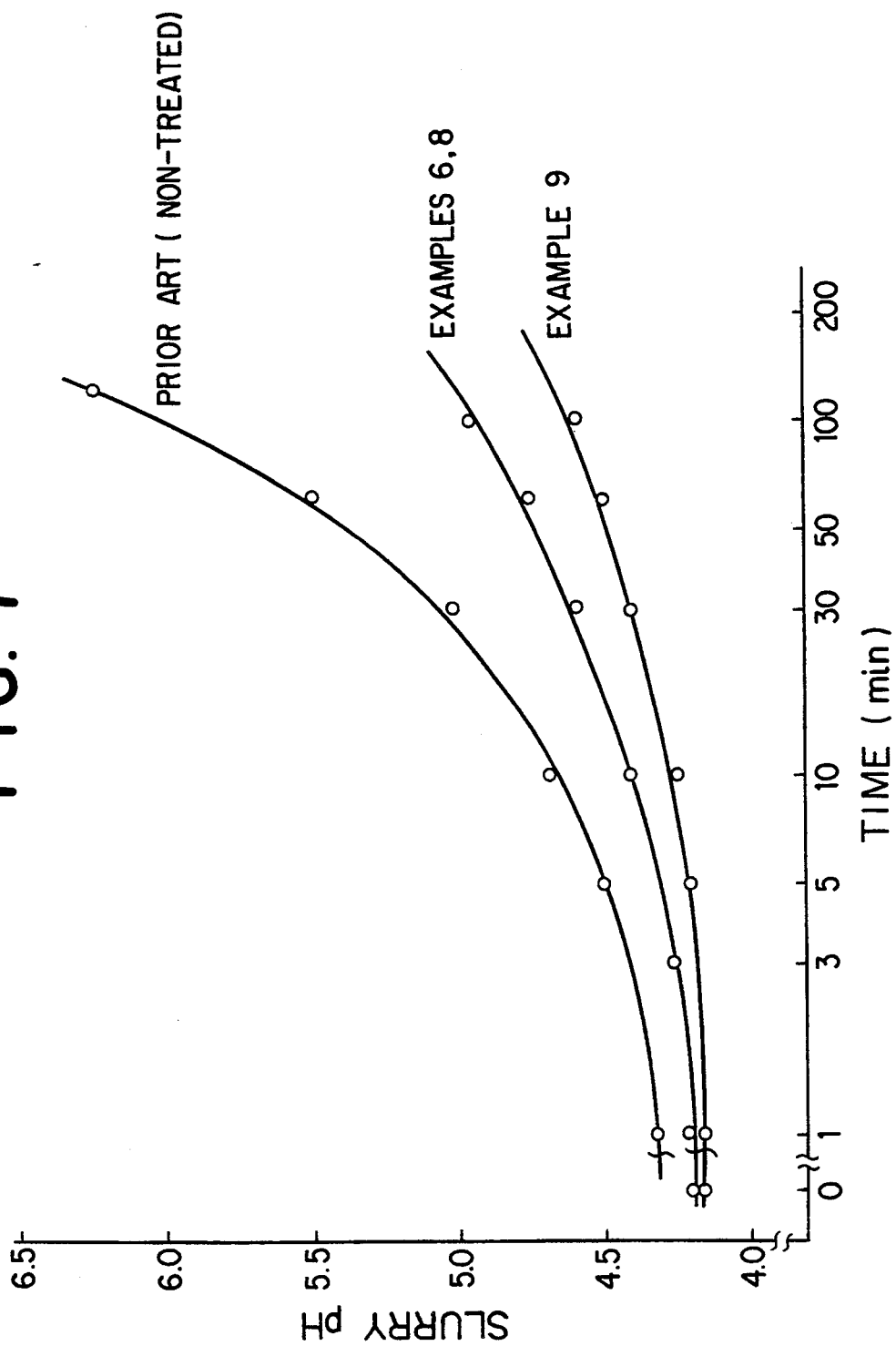

COLOR PICTURE TUBE WITH THE FLUORESCENT FILM OF THE RED EMISSION COMPONENT HAVING A MIXTURE OF EUROPIUM ACTIVATED RARE EARTH OXIDE PHOSPHORS

TECHNICAL FIELD

This invention relates to a color picture tube having a red emission composition comprising a combination of phosphors having specified emission colors on the fluorescent screen.

BACKGROUND TECHNIQUE

Heretofore, europium activated rare earth element oxysulfide (which will hereinafter often be referred to as "$Ln_2O_2S:Eu$" including, for example, "$Y_2O_2S:EU$" for europium activated yttrium oxysulfide) phosphors have been employed as a red emitting phosphor for a color picture tube, since these phosphors each have a high emission efficiency, are capable of controlling the color tone and are chemically stable so as to be suitable for use in a slurry coating method.

On the other hand, as one requisite for improving the properties of a color tube, it is required to enlarge the scope of color reproduction and develop therefor a red emitting phosphor having a deep chromaticity, This phosphor can readily be obtained by increasing the europium concentration, but increase of the brightness thereof is not always sufficiently obtained. In particular, as a countermeasure for the latest largesizing of a television or for a "High Definition TV" it has strongly been desired improve the brightness, but the situation does not satisfy the countermeasure. That is, the emission efficiency of the $Ln_2O_2S:Eu$ phosphor itself has exhaustedly been improved nearly to the saturation state.

As is well known in the art, there are other red emitting phosphors, for example europium activated rare earth element oxide phosphors, europium activated rare earth element vanadate phosphors, silver activated zinc cadmium sulfide phosphors, manganese activated zinc phosphate phosphors and the like. However, any of these phophors do not satisfy the above described color reproduction and brightness. Thus, there has been proposed a method comprising using a face plate containing neodymium or other elements, a method comprising providing a face plate with a special color filter on the surface thereof, a method comprising adding a specified pigment to a fluorescent film and the like. These methods consist of adding a filtering function to a specified wavelength of emitting colors of a phosphor to limit the transmittance of the light with the specified wavelength and thus enlarging the scope of color production. In any case, the effective brightness decreases.

It is an object of the present invention to provide a color picture tube, which has a fluorescent film of a red emission constituent exhibiting a red emission with a deep color tone and is excellent in emission brightness, and whereby the above described problems can be solved.

It is another object of the present invention to provide a cathode ray tube for color television, whereby the chemical stability of an europium activated rare earth element oxide (which will hereinafter often be referred to as $Ln_2O_3:Eu$) phosphor, as a red emission phosphor, is improved and application of a slurry coating method to the above described fluorescent film of a red emission constituent is rendered possible.

It is a further object of the present invention to provide a cathode ray tube for color television, which is excellent in emission brightness, color reproduction and beam current balance, by choosing emission colors in the specified range for those of the above described red emission constituent fluorescent film, a green emission constituent fluorescent membrane and a blue emission constituent fluorescent film.

DISCLOSURE OF THE INVENTION

The present invention provides a color picture tube having a face plate on which dot-shaped or stripe-shaped fluorescent film of blue, green and red emission constituents are respectively formed, characterized in that the fluorescent film of the red emission constituent is formed of a red emission composition comprising a mixture of an europium activated rare earth element oxide phosphor having an x value of 0.630 to 0.652 in CIE Chromaticity Representation and an europium activated rare earth element oxysulfide phosphor having an x value of 0.652 to 0.674 in CIE Chromaticity Representation, said red emission composition having an x value of 0.647 to 0.662 in CIE Chromaticity Representation.

In a preferred embodiment of the present invention, a color picture tube is provided in which the above described europium activated rare earth oxide phosphor is subjected to an insolubilization treatment of the surface thereof and the above described fluorescent films of blue, green and red emission constituents are respectively formed by the slurry coating method.

In a further preferred embodiment of the present invention, a color picture tube is provided in which the emission colors of the green emission fluorescent film and blue emission fluorescent film are respectively in the range of x of 0.200 to 0.330 and 0.145 to 0.155 in CIE Chromaticity Representation

BRIEF DESCRIPTION OF THE DRAWINGS

FIG. 6 is a graph showing change of the slurry pH of $Y_2O_3:Eu$ phosphors of Examples 6, 8, 9 and 10 and that of the prior art having not been subjected to an insolubilizing treatment with the passage of time.

FIG. 7 is a graph showing the relationship between the acid resistance and continuous slurry running time as to $Y_2O_3$:Eu phosphors of Examples 6, 8 and 9 and that of the prior art having not been subjected to an insolubilizing treatment.

BEST EMBODIMENT FOR CARRYING OUT THE INVENTION

Lanthanide element (Ln) of the phosphor composing the red emission composition of the present invention means at least one element selected from the group consisting of Y, Lu, Gd and La, preferably Y or a part of Y being substituted by Gd in a proportion of up to at most 70 mole %. The europium (Eu) activator means not only Eu but also Eu containing trace amount of at least one lanthanide element excluding the above described lanthanide elements (Ln), for example, Tb, Pr, Sm, Dy, etc. Specifically, it is preferable to use such a phosphor that Ln is Y or Y a part of which is substituted by Gd, for example, $Ln_2O_3$:Eu, Tb phosphor, $Ln_2O_3$:Eu, Dy phosphor, $Ln_2O_2S$:Eu, Tb phosphor, $Ln_2O_2S$:Eu, Pr phosphor, $Ln_2O_2S$:Eu, Tb, Sm phosphor, $Ln_2O_2S$:Eu, Pr, Sm phosphor and the like. The concentration of the activator is generally 2 to 8 mole %, preferably 3 to 6 mole % in the case of a $Ln_2O_3$ type phosphor, and is generally 4 to 8 mole % in the case of a $Ln_2O_2S$ type phosphor. Furthermore, a $Ln_2O_3$ type phosphor and $Ln_2O_2S$ type phosphor are mixed preferably in a proportion of 85/15 to 25/75 by weight, more preferably in a proportion of 50/50 to 70/30 by weight.

As the red pigment to be adhered to the above described phosphor, there can be used any materials capable of hardly any change of color even when heated; at about 450° C., for example, iron oxide red, indium sulfide and the like. The adhesion quantity of the red pigment is generally in a proportion of 0.05 to 0.70 weight %, preferably 0.10 to 0.50 weight % to the above described two phosphors.

Up to the present time, the $Ln_2O_3$:Eu phosphor has somewhat been employed as a red phosphor for a color picture tube by a dusting method. However, since this phosphor is chemically unstable to some extent in a coating slurry in the slurry coating method having at present been put to practical use as a method of making a fluorescent screen, is hard to be regenerated and reused and is in a much narrower range for controlling the color tone, as compared with the $Ln_2O_2S$:Eu phosphor, the former phosphor has completely been replaced by the $Ln_2O_2S$:Eu phosphor.

Figure 3:
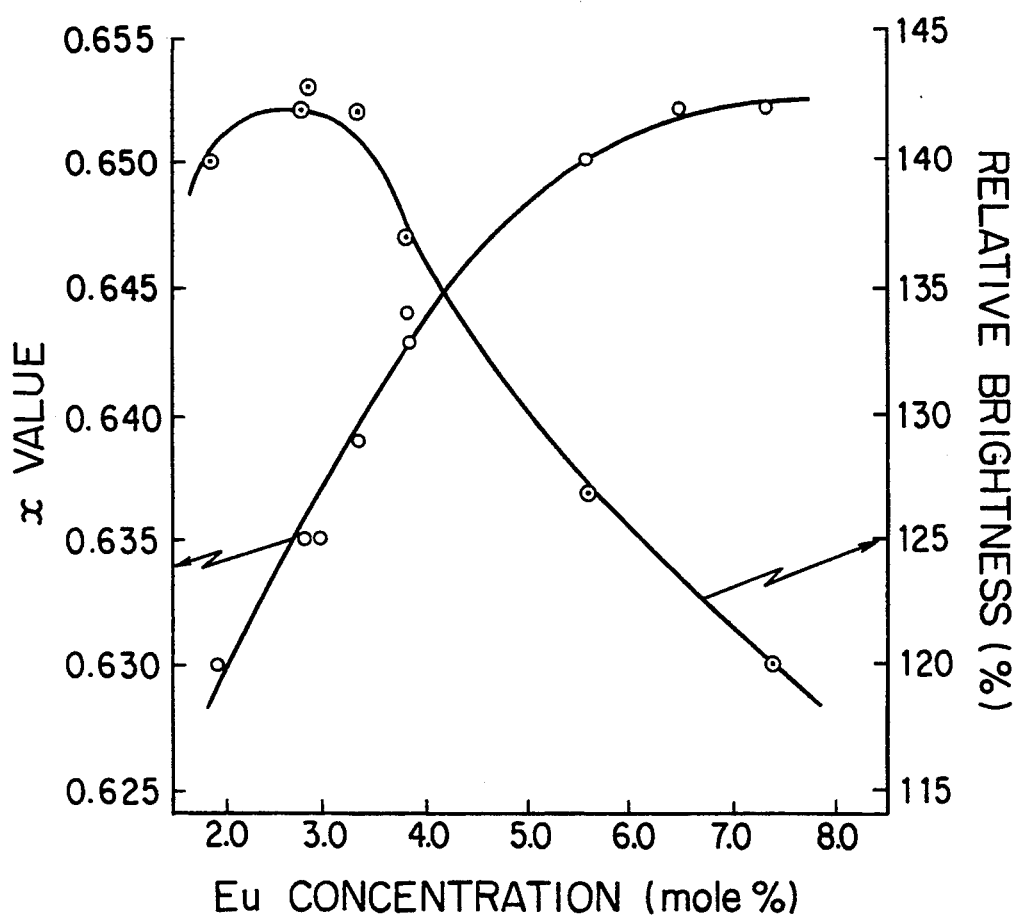
FIG. 3 is a graph showing the relationship between the emission chromaticity (x value) and relative brightness when the concentration of the activator Eu is varied as to a $Y_2O_3:Eu$ phosphor.
Figure 4:
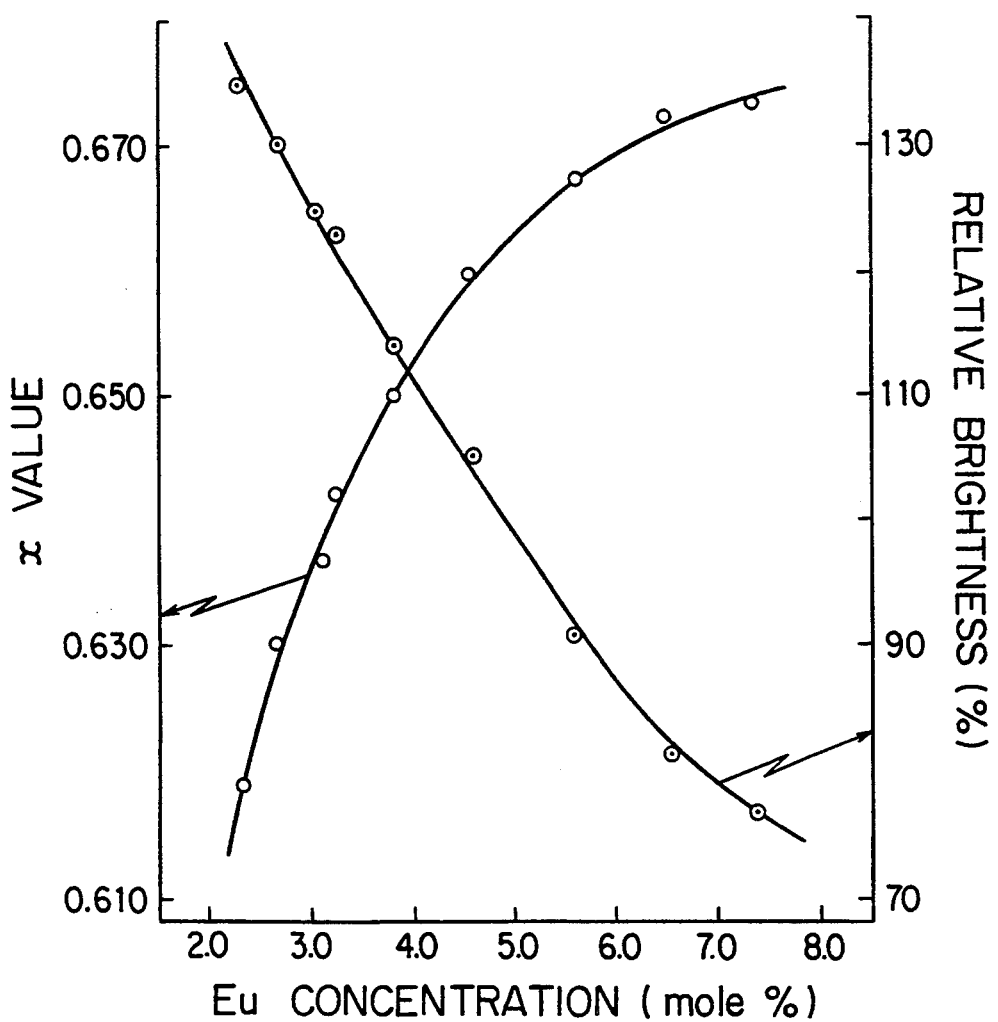
FIG. 4 is a graph showing the relationship between the emission chromaticity (x value) and relative brightness when the concentration of the activator Eu is varied as to a $Y_2)_2S:Eu$ phosphor.

When the Eu concentration of the $Ln_2O_3$:Eu phosphor is changed from 3 to 4 mole % in the prior art to 8 mole %, the color tone can somewhat be changed as shown in FIG. 3. Herein, the Eu concentration means 100a mole % in the $Ln_2O_2$:Eu phosphor composition $(Ln_{1-a}Eu_a)_2O_3$ and so forth. However, the degree of change of the color tone is smaller than that of the $Ln_2O_2S$:Eu phosphor as shown in FIG. 4.

Noting the properties of the $Ln_2O_3$:Eu phosphor, i.e. a slight change of the emission color and a high emission luminance, and the properties of the $Ln_2O_2S$:Eu phosphor, i.e. a large change of the emission color with the Eu concentration and a relatively low emission brightness, the inventors have found that unexpected results in solving the above described problems can be obtained by the use of a red emission composition having an x value adjusted to 0.647 to 0.662, which is obtained by mixing an $Ln_2O_3$:Eu phophor having an x value of 0.630 to 0.652 according to CIE chromaticity representation and an $Ln_2O_2S$:Eu phophor having an x value of 0.647 to 0.662.

The above described red emission composition comprises preferably a mixture of an Eu-activated rare earth element oxide phosphor having an Eu concentration of 2.0 to 8.0 mole %, more preferably 3.0 to 6.0 mole % and an Eu-activated rare earth element oxysulfide phophor having an Eu concentration of 4.0 to 8.0 mole % with a rare earth element oxide phosphor rare earth element oxysulfide phosphor mixed weight ratio of 85/15 to 25/75, more preferably 50/50 to 70/30.

On the other hand, the $Ln_2O_3$:Eu phosphor of the prior art, which has not been subjected to an insolubilization treatment, tends to be slightly dissolved in a slurry to form the corresponding hydroxide, raise the pH value, aggregate the phosphor and increase the slurry viscosity with the passage of time, thus causing to change the property of the slurry. Since the phosphor slurry is generally used in a continuous and circular manner for at least several days to ten days, the changes of pH and viscosity of the slurry during the passage of time hinders formation of fine pitch picture elements (dots, stripes) with a high density and excellent shape and unfavorably affects the quality of the resulting fluorescent film.

According to the present invention, application of the $Ln_2O_3$:Eu phophor to the above described red emission composition is rendered possible by subjecting the surface thereof to an insolubilizing treatment, improving the chemical stability thereof in a coating slurry and thus maintaining the stability to the slurry and the coating stability.

As the insolubilizing agent, there can be used coating agents of silica type, silicon-containing organic compound type and zinc aluminate type, hydrophilicity-imparted acrylic resins and styrene-butadiene resins. Above all, it is preferable to coat the surface of a phosphor With at least one of these insolubilizing agents.

The present invention will now be illustrated in detail in the case of Y as a typical example of Ln, but is not intended to be limited thereto.

Figure 1:
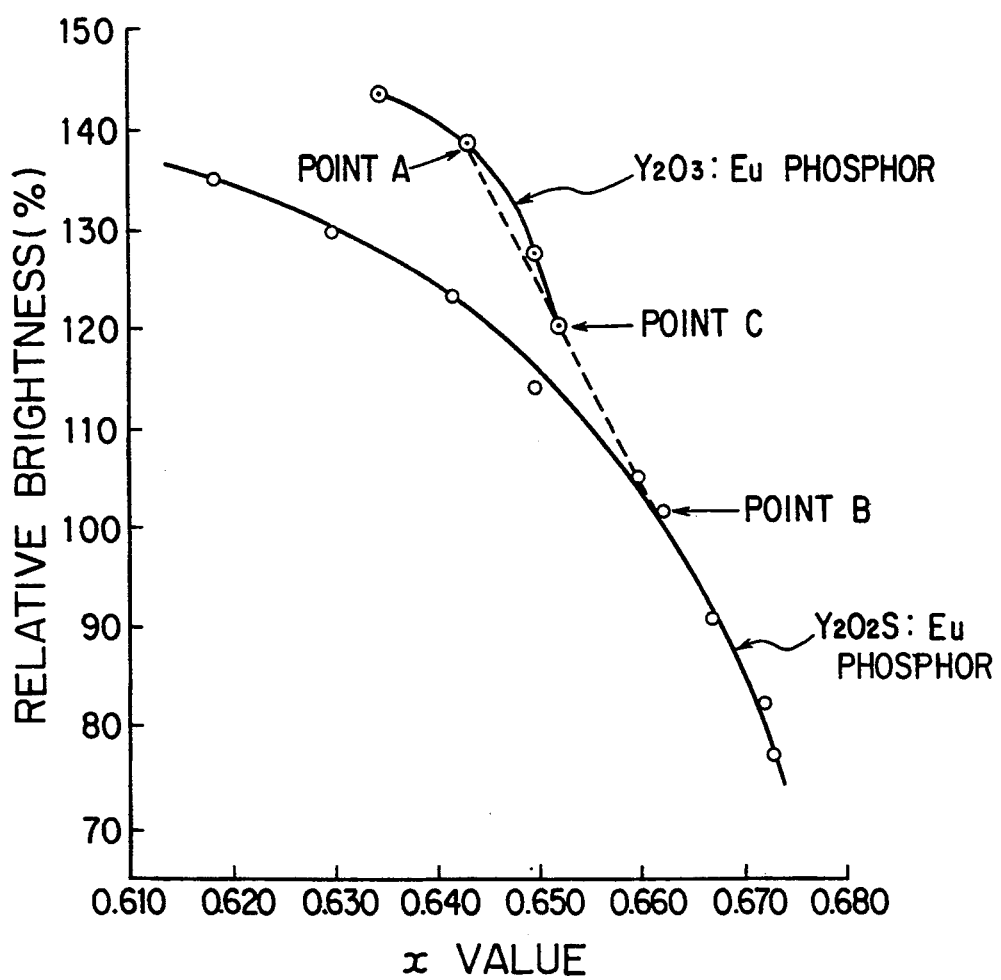
FIG. 1 is a graph showing the relationship between the emission chromaticity (x value) and relative brightness in the same scale as to an europium-activated yttrium oxide (hereinafter referred to as $Y_2O_3:Eu$) phosphor and $Y_2O_2S:Eu$ phosphor and the characteristic of a red emission composition comprising a mixture of both the phosphors.

The relationship of the chromaticity (x value) and brightness between a $Y_2O_3$:Eu phosphor and $R_2O_2S$:Eu phosphor, on a same scale, is shown in FIG. 1. As is evident from FIG. 1, the $Y_2O_3$:Eu phosphor exhibits a varied width of color tone as represented by an x value of 0.630 to 0.652, which is smaller than that of the $R_2O_2S$:Eu phosphor, but in comparison concerning the brightness at the same chromaticity (x value), the former exhibits an about 10 to 20 % higher value than the latter.

According to the present invention, a red emission with a deep color tone in the range of x=0.647-0.662 having lately been desired as to enlargement of the range of color reproduction can be obtained by combining the $Y_2O_3$:Eu phosphor excellent in brightness and the $Y_2O_2S$:Eu phosphor with a deep color tone, i.e. a large x value, and moreover, the brightness can considerably be improved as compared with the case of using the $Y_2O_2S$:Eu phosphor of the prior art or pigment-adhered phosphor thereof alone.

The effects or advantages by the above described joint use are, as shown in FIG. 1, that when a $Y_2O_3$:Eu phosphor with an x value of 0.643 and brightness of 138% (point A) is mixed with a $Y_2O_2S$:Eu phosphor with an x value of 0.662 and brightness of 101% (point B), a red emission composition with an x value of 0.652 and brightness of 120% can be obtained, which gives an improved brightness by about 8% as compared with the $Y_2O_2S$:Eu phosphor with the same chromaticity (Eu activator quantity 4.0 mole %, x value 0.652, relative brightness 112%) alone. This red emission composition is in the region of color tone which has been used at the present time.

The foregoing illustration is related with the joint use of pigment-free phosphors, but the effects by the joint use can also be given in the case of pigment-adhered phosphors. Above all, a red emission composition comprising a pigment-adhered $Y_2O_2S$:Eu phosphor and a pigment-free $Y_2O_3$:Eu phosphor, in combination, is most excellent. It is considered that a red pigment such as iron oxide red is localized in a $Y_2O_2S$:Eu phosphor needing improvement of the contrast, whereby the internal light absorption in a mixed system can be reduced and it is rendered possible to improve the brightness.

However, when a red pigment such as iron oxide red is adhered to both of a $Y_2O_2S$:Eu phosphor and $Y_2O_3$:Eu phosphor, a fluorescent film can more uniformly be formed with a stronger bonding strength as compared with a case of allowing the pigment adhere to either the former or the latter. This is more preferable for a color picture tube.

In the present invention, the adhesion quantity of a red pigment to the above described two phosphors is respectively in the range of preferably 0.05 to 0.70 weight %, more preferably 0.10 to 0.50 weight %.

As the $Y_2O_2S$:Eu phosphor, there is generally used one whose emission color is represented by an x value of 0.652 to 0.674, during which the activator quantity is 4 to 8 mole %. When a red pigment is allowed to adhere to this phosphor, the emission color is somewhat shifted to the longer wavelength side (larger x value side). Thus, in the case of obtaining a same emission color, the Eu activator quantity can be reduced by 0.1 to 0.5 mole % and in the case of a same Eu activator quantity, the emission color can be maintained in a deeper red region. That is, when using no red pigment, the Eu activator quantity is 4.0 to 8.0 mole % and when allowing a red pigment adhering, the Eu activator quantity is 3.5 to 8.0 mole %, preferably 3.8 to 8.0 mole %, which ranges are suitable in view of balance of the emission color and brightness.

As the $Y_2O_3$:Eu phosphor, there is generally used one whose emission color is represented by an x value of 0.630 to 0.652, during which the activator quantity is 2 to 8 mole %. When a red pigment is allowed to adhere to this phosphor, the emission color is slightly shifted to the longer wavelength side (larger x value side). Thus, in the case of obtaining a same emission color, the Eu activator quantity can be reduced by 0.03 to 0.15 mole % and in the case of a same Eu activator quantity, the emission color can slightly be maintained in a deeper red region. That is, when using no red pigment, the Eu activator quantity is 2.0 to 8.0 mole %, preferably 3.8 to 6.0 mole % and when allowing a red pigment adhering, the Eu activator quantity is 2.0 to 8.0 mole %, preferably 2.85 to 6.0 mole %.

In the present invention, as described above, the maximum value of the emission color (x value) can be increased to 0.670, 0.008 larger than 0.662 when using no red pigment, by allowing a red pigment to adhere respectively to the above described two phosphors, and consequently, the above described advantages of the present invention can be obtained.

In order to obtain this red emission composition, it is desirable to adjust the mixing weight ratio of ($Y_2O_3$ phosphor/$Y_2O_2S$ phosphor) to 85/15 to 25/75, since if the mixing weight ratio is more than 85/15, the color reproduction is degraded and if less than 25/75, the effect of improving the brightness is not sufficient. A preferable range of the mixing weight ratio is 50/50 to 70/30.

In the thus obtained red emission composition, the ratio of emission intensities ($\lambda_{626}/\lambda_{611}$) of the $Y_2O_2S$:Eu phosphor and $Y_2O_3$:Eu phosphor at: emission peaks of 626 nm and 611 nm is in the range of 0.2 to 0.3.

The present invention will be illustrated in detail by the following examples without limiting the same.

(Example 1)

226 g of yttrium oxide and 14.1 g of europium oxide were dissolved in hydrochloric acid, treated with oxalic acid to form coprecipitated oxalates and decomposed at 1000° C. to obtain $(Y_{0.962}Eu_{0.038})_2O_3$. Then, 0.05 weight % of $B_2O_3$ as a flux was added thereto and fired at 1450° C. to obtain a phosphor component of $Y_2O_3$:Eu (Eu, 3.8 mole %). The resulting phosphor component was subjected to a dispersing treatment in a ball mill and then to a surface treatment with a coating agent of zinc aluminate type and finished by drying. In addition, 0.4%, on dry basis, of $GeO_2$, as a pH rising inhibitor, was added thereto to obtain a phopshor component A.

On the other hand, in order to correct the chromaticity of the above described phopshor component, another phopshor component B of $Y_2O_2S$:Eu (Eu, 4.8 mole %) with a deep chromaticity, i.e. high concentration Eu was prepared.

These phosphor components were mixed in a mixing weight ratio (A/B) of 1/1 to form a red emission composition of Example 1.

When the properties of the red emission composition and mixed components were measured using a Demantable's electron beam stimulus apparatus at conditions of 20 kV and 1.0 $\mu A/cm^2$, it was found as shown in Table 1 that the relative brightness was increased by about 7% to give a higher brightness as compared with a $Y_2O_2S$:Eu phosphor (Eu, 4.0 mole %) of the prior art, having the same emission chromaticity as the red emission composition of Example 1.

When the above described red emission composition was converted into a slurry using a light-sensitive liquid of PVA-Cr type, coated onto a panel and subjected to measurement of the brightness of a monochrome red cathode ray tube, the relative brightness was improved by about 8% to give higher brightness.

TABLE 1

| | Emission Chromaticity | | Relative Brightness (%) |
|---|---|---|---|
| | x | y | |
| Phosphor Component A, $Y_2O_3$:Eu (Eu, 3.8 mole %) | 0.643 | 0.351 | 123 |
| Phosphor Component B, $Y_2O_2S$:Eu (Eu, 4.8 mole %) | 0.662 | 0.333 | 90 |
| Example 1, Mixed Phosphors (A/B = 1/1) | 0.652 | 0.342 | 107 |
| $Y_2O_2S$:Eu (Eu, 4.0 mole %) of the Prior Art | 0.652 | 0.340 | 100 |
| Fluorescent Surface coated with Mixed Phosphors (A/B = 1/1) | 0.651 | 0.340 | 108 |
| Fluorescent Surface coated with Phosphors | 0.652 | 0.340 | 100 |

TABLE 1-continued

|  | Emission Chromaticity | | Relative |
| --- | --- | --- | --- |
|  | x | y | Brightness (%) |
| of the Prior Art | | | |

(EXAMPLES 2 and 3)

A phosphor component C of $Y_2O_3$:Eu (Eu, 5.7 mole %) and phosphor component D of $Y_2O_2S$:Eu (Eu, 4.8 mole %) were prepared and subjected to an insolubilizing treatment in an analogous manner to Example 1 and mixed in mixing weight ratios (C/D) of 1/1 and 7/3 to obtain red emission compositions of Examples 2 and 3. When these red emission phosphors and red emission compositions were compared with a $Y_2O_2S$:Eu phosphor (Eu, 4.2 mole %) of the prior art and a $Y_2O_2S$:Eu phosphor (Eu, 4.0 mole %) of the prior art, each having a substantially same emission color, as shown in Table 2, the relative brightness of the red emission compositions of Examples 2 and 3 were improved by about 6% and about 8% to give higher brightness. As evident from the mixing weight ratio (C/D) of Table 2, when a more shallow chromaticity was reproduced, the mixing ratio of the phosphor component C of $Y_2O_3$:Eu was increased and the relative brightness was improved by about 2%. Moreover, reproduction of the chromaticity could be accomplished up to an x value of about 0.656 while maintaining the brightness superior by mixing the above described $Y_2O_3$:Eu phopshor and pigment-free $Y_2O_2S$:Eu phosphor.

TABLE 2

|  | Emission Chromaticity | | Relative |
| --- | --- | --- | --- |
|  | x | y | Brightness (%) |
| Phosphor Component C, $Y_2O_3$:Eu (Eu, 5.7 mole %) | 0.650 | 0.346 | 117 |
| Phosphor Component D, $Y_2O_2S$:Eu (Eu, 4.8 mole %) | 0.662 | 0.333 | 96 |
| Example 2, Mixed Phosphors (C/D = 1/1) | 0.656 | 0.339 | 106 |
| $Y_2O_2S$:Eu (Eu, 4.2 mole %) of the Prior Art | 0.656 | 0.339 | 100 |
| Example 3, Mixed Phosphors (C/D = 7/3) | 0.653 | 0.341 | 108 |

TABLE 2-continued

|  | Emission Chromaticity | | Relative |
| --- | --- | --- | --- |
|  | x | y | Brightness (%) |
| $Y_2O_2S$:Eu (Eu, 4.2 mole %) of the Prior Art | 0.653 | 0.339 | 100 |

(EXAMPLES 4 and 5)

A phosphor component E of $Y_2O_3$:Eu (Eu, 3.8 mole %) and phosphor component G of $Y_2O_3$:Eu (Eu, 5.7 mole %) were prepared and subjected to an insolubilizing treatment in an analogous manner to Example 1. A phosphor component F of $Y_2O_2S$:Eu (Eu, 4.7 mole %) was further prepared, to which 0.5 weight % of $Fe_2O_3$ pigment was adhered by a coacervation method using gelatin and gum arabic.

Figure 2:
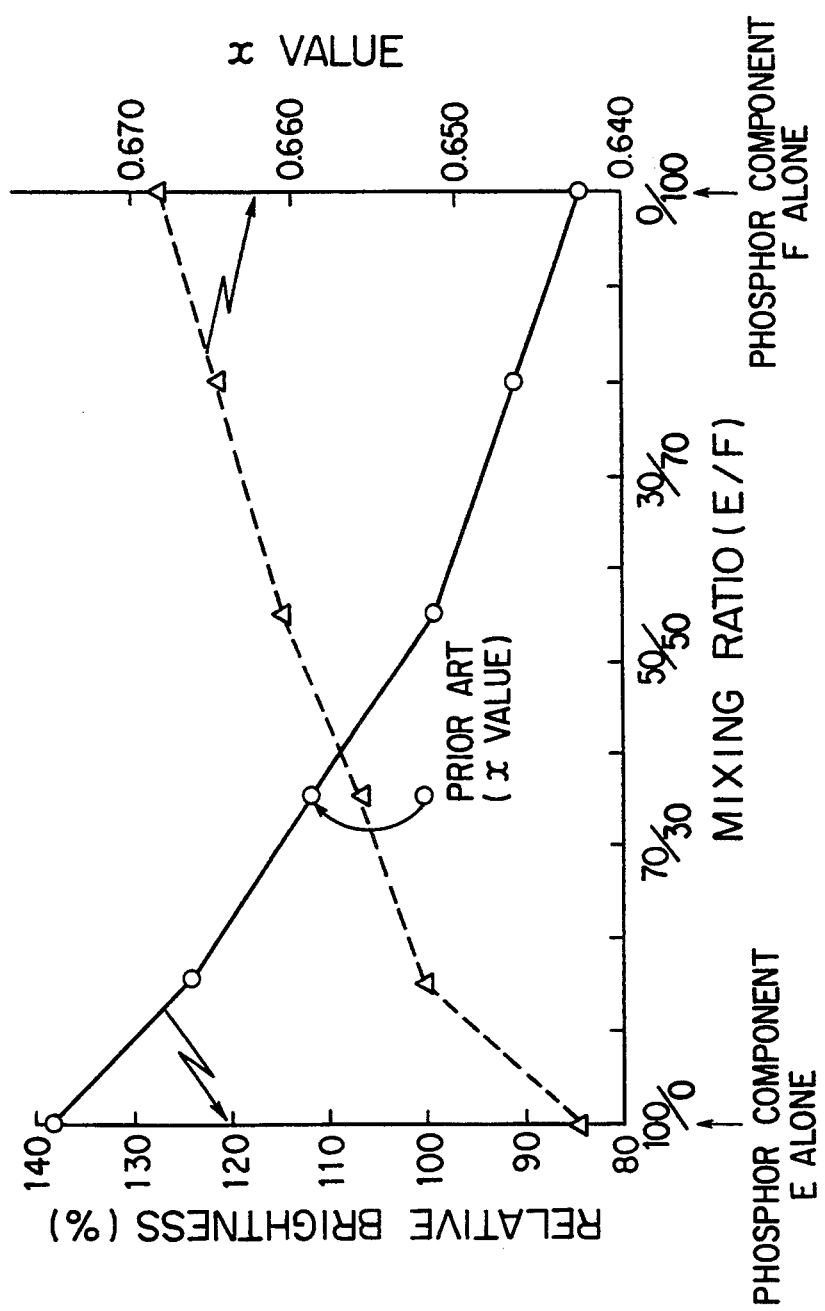
FIG. 2 is a graph showing the relationship between the emission chromaticity (x value) and relative brightness and the mixture ratio of a $Y_2O_3:Eu$ phosphor and pigment-adhered $Y_2O_2S:Eu$ phosphor.

Firstly, the phopshor components E and F were mixed in a proportion of 65/35 by weight to obtain a red emission composition of Example 4. When this red emission composition of Example 4 was compared with a 0.15 weight % $Fe_2O_3$ pigment-adhered $Y_2O_2S$:Eu phosphor (Eu, 3.8 mole %) of the prior art, having a substantially same emission chromaticity and reflectance, the relative brightness of the red emission composition of Example 4 was improved by about 12% to give higher brightness. FIG. 2 is a graph showing changes of the emission chromaticity (x value) and relative brightness of a red emission composition, obtained when the mixing weight ratio (E/F) of the above described two phosphor components is changed.

Then, the above described phosphor component G with a deep chromaticity and the above described pigment-adhered phosphor component F were mixed in a weight ratio of 65/35 to obtain a red emission composition of Example 5. When this red emission composition of Example 5 was compared with a 0.15 weight % $Fe_2O_3$ pigment-adhered $Y_2O_2S$:Eu phosphor (Eu, 4.7 mole %) of the prior art, having a substantially same emission chromaticity and reflectance, the relative brightness of the red emission composition of Example 5 was improved by about 14% to give higher brightness. It is apparent from this Example that reproduction of the chromaticity could be accomplished up to an x value of about 0.663, while maintaining the brightness superior.

TABLE 3

|  | Emission Chromaticity | | Relative Brightness | Reflectance (%) (500 nm) |
| --- | --- | --- | --- | --- |
|  | x | y | | |
| Phosphor Component E, $Y_2O_3$:Eu (Eu, 3.8 mole %) | 0.643 | 0.351 | 138 | 97.0 |
| Phosphor Component F, 0.5% pigment-adhered $Y_2O_2$:Eu (Eu, 4.7 mole %) | 0.668 | 0.328 | 84 | 30.5 |
| Example 4, Mixed Phosphors (E/F = 65/35) | 0.656 | 0.337 | 112 | 51.9 |
| 0.15% pigment-adhered $Y_2O_2S$:Eu (Eu, 3.8 mole %) of the Prior Art | 0.655 | 0.340 | 100 | 51.0 |
| Phosphor Component G, $Y_2O_3$:Eu (Eu, 5.7 mole %) | 0.650 | 0.346 | 127 | 97.0 |
| Phosphor Component H, 0.5% pigment-adhered $Y_2O_2S$:Eu (Eu, 4.7 mole %) | 0.668 | 0.328 | 84 | 30.5 |
| Example 5, Mixed Phosphors (G/F = 65/35) | 0.663 | 0.334 | 114 | 52.3 |
| 0.15% pigment-adhered $Y_2O_2S$:Eu (Eu, 4.7 mole %) | 0.663 | 0.333 | 100 | 51.0 |

(EXAMPLE 6)

100 g of a phosphor component of $Y_2O_3$:Eu (Eu, 3.8 mole %) prepared in the similar manner to Example 1 was charged in a 500 ml beaker, to which 200 ml of pure water was added, and the mixture was stirred. Furthermore, 1.25 ml of potassium water glass (PS-A —commercial name— made by Tokyo Oka KK) containing 20% of $SiO_2$ was added thereto, adequately stirred, suspended and dispersed. This suspension was warmed at 70° C. with agitation and dilute acetic acid was added little by little to adjust the pH to 6.0. Then, the mixture was warmed at 90° C., stirred for 2 hours and allowed to stand for 30 minutes to precipitate a phosphor, followed by separating the supernatant by decantation and rinsing with pure water two times. The resulting phosphor was then filtered, dehydrated, dried at 120° C. for 15 hours, passed through a sieve of 300 mesh and subjected to an insolubilizing treatment with a silicon-type insolubilizing agent to obtain a phopshor component.

Figure 5:
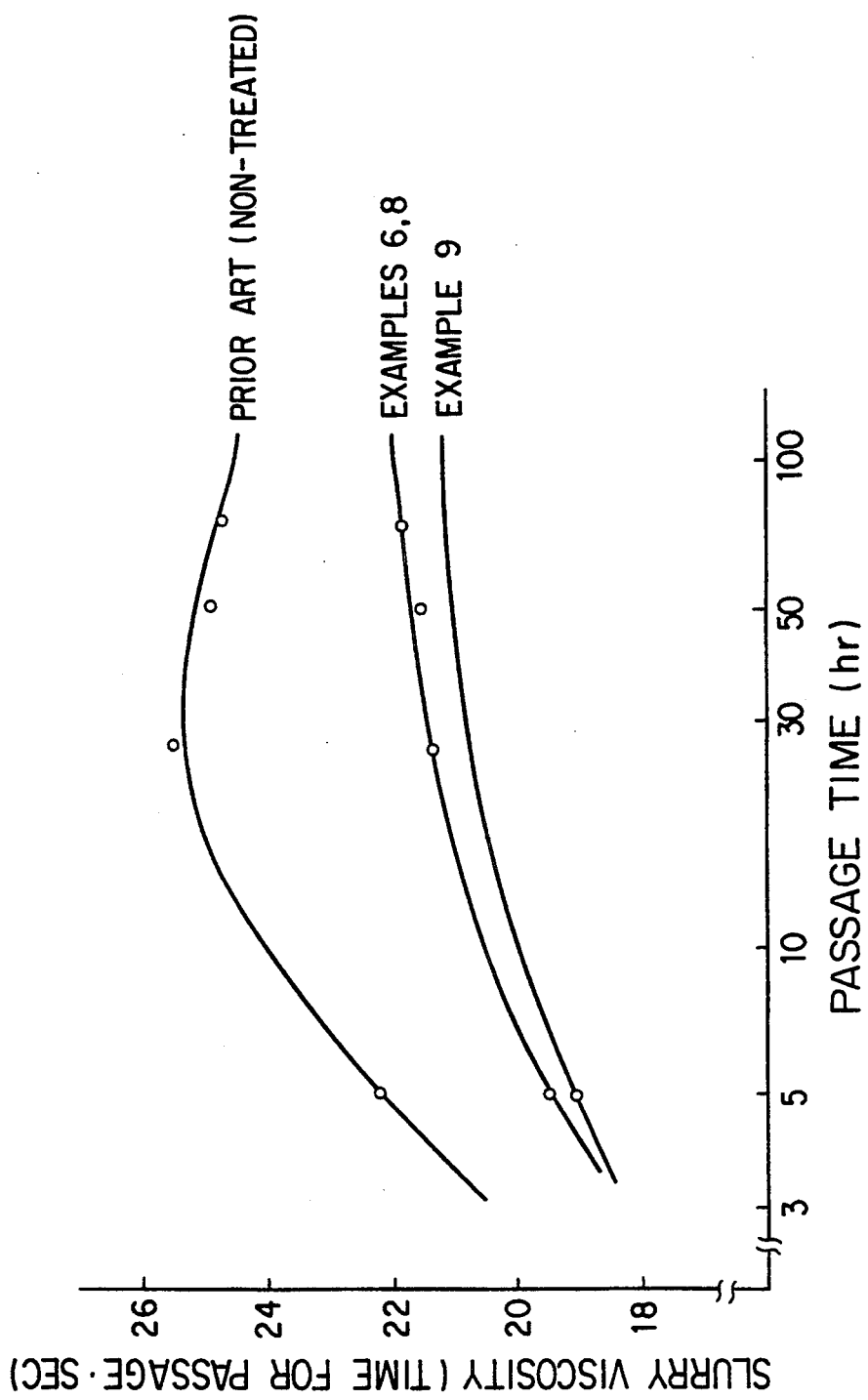
FIG. 5 is a graph showing change of the slurry viscosity of $Y_2O_3:Eu$ phosphors of Examples 6, 8 and 9 and that of the prior art having not been subjected to an insolubilizing treatment with the passage of time.

When the thus obtained phosphor component was dispersed in a light-sensitive liquid of PVA-Cr type to form a slurry and changes of the slurry viscosity and pH during the passage of time were examined, the phosphor component exhibited much better stability to slurry as compared with the prior art phosphor component free from the insolubilizing treatment with potassium water glass, as shown in FIG. 5 and FIG. 6. When the relationship of the acid resistance (insolubilizing property) and continuous using time of the slurry was similarly examined, much better property than that of the prior art article was exhibited, as shown in FIG. 7.

FIG. 7 shows results of an accelerated test in which 10 g of the above described phosphor was added to an acidic solution of 50 ml of pure water and 1 ml of dilute acetic acid and while stirring, change of the pH of the slurry was determined during the passage of time. The rising of this pH value is due to that the $Y_2O_3$:Eu phosphor is dissolved to form yttrium hydroxide, thus causing aggregation of the phosphor, rising of the slurry viscosity and hindrance of a uniform coating. In other words, a small rising of the pH value means that the acid resistance property is excellent.

When a $Y_2O_3S$:Eu (Eu, 4.8 mole %) phosphor component was added to the above described phosphor component to obtain a light-sensitive liquid of PVA-Cr type and coated onto a panel to obtain a monochrome red cathode ray tube an analogous manner to Example 1, the relative brightness was improved by about 8% similar to Example 1.

Furthermore, when using a ZuS:Cu, Al (Cu, 65 ppm) phosphor having an x value of 0.281 and y value of 0.619, as a green emission phosphor, and a ZnS:Ag, Al (Ag, 300 ppm) phosphor having an x value of 0.149 and y value of 0.050, as a blue emission phosphor, in addition to the above described red emission composition (x value 0.652, y value 0.342) to produce a color picture tube, this color picture tube exhibited a more excellent color reproduction region, emission brightness and beam current balance than that using a red emission phosphor of the prior art.

When a similar test to above described was carried out using a $(Y_{0.5}Gd_{0.5})_2O_3$:Eu (Eu, 3.8 mole %) phosphor component instead of the above described $Y_2O_3$:Eu (Eu, 3.8 mole %) phosphor component, the similar advantages were obtained to described above.

(EXAMPLE 7)

To a $Y_2O_3$:Eu (Eu, 3.8 mole %) phopshor, subjected to an insolubilizing treatment in the similar manner to Example 6, was adhered 0.20 weight % of a $Fe_2O_3$ pigment by a coacervation method using gelatin and gum arabic to prepare a phosphor component I.

Similarly, 0.15 weight % of the $Fe_2O_3$ pigment was adhered to a $Y_2O_2S$:Eu (Eu, 4.8 mole %) phosphor to prepare a phopshor component J.

The above described phosphor components I and J were mixed in a mixing ratio of 65/35 to obtain a red emission composition.

The red emission composition of this Example 7 exhibited an improved brightness by about 12% similar to Example 4 in comparison with a $Fe_2O_3$ pigment-adhered $Y_2O_2S$:Eu (Eu, 3.8 mole %) phosphor (iron oxide red adhered 0.15 weight %) of the prior art, having a substantially same emission chromaticity.

TABLE 4

| | Emission Chromaticity | | Relative |
|---|---|---|---|
| | x | y | Brightness (%) |
| Phosphor Component I, 0.2 wt % pigment-adhered $Y_2O_3$:Eu (Eu, 3.8 mole %) | 0.650 | 0.346 | 126 |
| Phosphor Component J, 0.15 wt % pigment-adhered $Y_2O_2S$:Eu (Eu, 4.7 mole %) | 0.667 | 0.328 | 90 |
| Example 10, Mixed Phosphors (I/J = 65/35) | 0.656 | 0.337 | 112 |
| 0.15 wt % pigment-adhered $Y_2O_2S$:Eu (Eu, 3.8 mole %) of the Prior Art | 0.655 | 0.340 | 100 |

(EXAMPLE 8)

In Example 6, 2.5 ml of a colloidal silica containing 20% of $SiO_2$ (SI-500, —commercial name— made by Shokubai Kasei KK) was added in place of 1.25 ml of the potassium water glass as an insolubilizing agent of the $Y_2O_3$:Eu (Eu, 3.8 mole %) phosphor component, adequately stirred and suspended and dispersed. The resulting suspension was warmed at 50° C. with agitation and dilute hydrochloric acid was added little by little to adjust the pH to 6.0. Then, the mixture was warmed at 70° C., stirred for 2 hours and allowed to stand for 30 minutes to precipitate a phosphor, followed by separating the supernatant by decantation and rinsing with pure water two times. The resulting phosphor was then filtered, dehydrated, dried at 150° C. for 10 hours, passed through a sieve of 300 mesh and subjected to an insolubilizing treatment with a silicon-type insolubilizing agent to obtain a phosphor component.

When the thus obtained phosphor component was dispersed in a light-sensitive liquid of PVA-Cr type to form a slurry and changes of the slurry viscosity and pH during the passage of time were examined, the phosphor component exhibited much better stability to slurry, similar to Example 6, as compared with the prior art phopshor component free from the insolubilizing treatment with the colloidal silica as described above, as shown in FIG. 5 and FIG. 6. When the acid resistance (insolubilizing property) was also examined, much better property than that of the prior art article, similar to Example 6 was exhibited, as shown in FIG. 7.

When using the green emission phosphor and blue emission phosphor in addition to the above described red emission composition to obtain a color picture tube in an analogous manner to Example 6, the similar advantages were obtained to Example 6.

(Example 9)

100 g of a phosphor component of $Y_2O_3$:Eu (Eu, 5.7 mole %) prepared in the similar manner to Example 1 was charged in a 500 ml beaker, to which 200 ml of pure water was added, and the mixture was stirred. Furthermore, 1.25 ml of potassium water glass (PS-A —commercial name— made by Tokyo Oka KK) containing 20% of $SiO_2$ was added thereto, adequately stirred, suspended and dispersed. This suspension was warmed at 70° C. with agitation and dilute acetic acid was added little by little to adjust the pH to 6.0. Then, the mixture was warmed at 90° C., stirred for 2 hours and allowed to stand for 30 minutes to precipitate a phosphor, followed by separating the supernatant by decantation and rinsing with pure water two times. The slurry was adequately stirred, to which an acrylic emulsion (LC-40 —commercial name— made by Nippon Acryl KK) was added in a proportion of 500 ppm to the weight of the phosphor and dilute acetic acid was further added to adjust the pH to 5.0, and the mixture was allowed to stand for 30 minutes to precipitate a phosphor, followed by washing with pure water two times. The resulting phosphor was then filtered, dehydrated, dried at 120° C. for 15 hours, passed through a sieve of 300 mesh and subjected to an insolubilizing treatment with a silicon-type insolubilizing agent and acrylic resin to obtain a phopshor component.

When the thus obtained phosphor component was dispersed in a light-sensitive liquid of PVA-Cr type to form a slurry and changes of the slurry viscosity and pH during the passage of time were examined, the phosphor component exhibited much better stability to slurry as compared with the prior art phosphor component free from the insolubilizing treatment, as shown in FIG. 5 and FIG. 6. When the acid resistance (insolubilizing property) was also examined, much better property than that of the prior art article was exhibited, as shown in FIG. 7. When the red emission composition of Example 2 was similarly used, similar advantages to Example 2 were obtained.

Furthermore, when using a green emission phosphor composition having an x value of 0.277 and y value of 0.630 [mixture of ZnS:Cu, Al(Cu activator quantity 65 ppm) phosphor and $Zn_2SiO_4$:Mn phosphor] and a ZnS:Ag, Al (Ag activator quantity 300 ppm) phosphor having an x value of 0.149 and y value of 0.050, as a blue emission phosphor, in addition to the above described red emission composition (x value 0.656, y value 0.339) to produce a color television cathode ray tube, this color picture tube exhibited a more excellent color reproduction region, emission brightness and beam current balance than that using a red emission phosphor of the prior art.

When a similar test to above described was carried out using a $(Y_{0.7}Gd_{0.3})_2O_3$:Eu (Eu, 5.7 mole %)phosphor component instead of the above described $Y_2O_3$:Eu (Eu, 5.7 mole %) phosphor component, the similar advantages were obtained to described above.

(EXAMPLE 10)

100 g of a phosphor component of $Y_2O_3$:Eu (Eu, 5.7 mole %) prepared in the similar manner to Example 1 was charged in a 500 ml beaker, to which 200 ml of pure water was added, and the mixture was stirred. Furthermore, 2.5 ml of a 20% aqueous solution of zinc sulfate ($ZnSO_4.7H_2O$) was added thereto, adequately stirred, suspended and dispersed. This suspension was warmed at 60° C. with agitation and dilute caustic soda was added little by little to adjust the=pH to 11.0. Then, the mixture was warmed at 60° C., stirred for 1 hour, to which 5.5 ml of a 10% aqueous solution of sodium aluminate ($NaAlO_2$) was then gradually added, followed by stirring for further 1 hour. Then, the mixture was allowed to stand for 30 minutes to precipitate a phosphor, followed by separating the supernatant by decantation and rinsing with pure water once. Pure water was added thereto, dilute acetic acid was added little by little with agitation to adjust the pH to 7.5, and the mixture was stirred for furthers20 minutes, allowed to stand for 30 minutes to precipitate a phosphor, followed by separating the supernatant by decantation and washing with pure water two times. The resulting phosphor was then filtered, dehydrated, dried at 120° C. for 15 hours, passed through a sieve of 300 mesh and subjected to an insolubilizing treatment with a coating agent of zinc aluminate to obtain a phosphor component.

When the thus obtained phosphor component was dispersed in a light-sensitive liquid of PVA-Cr type to form a slurry and changes of the slurry viscosity and pH during the passage of time were examined, the phosphor component exhibited very good stability to slurry as shown in FIG. 6.

When a color picture tube was produced in an analogous manner to Example 9 except using this phosphor, similar results were obtained to Example 9.

Utility and Possibility on Commercial Scale

According to the present invention, there can be provided a cathode ray tube for color television, provided with a red emission film having a satisfactory color tone and high brightness by the use of a red emission composition comprising a $Ln_2O_3$:Eu phosphor having an excellent relative brightness property and an x value in the specified range by CIE chromaticity representation and a $Ln_2O_2S$ Eu phopshor having a deep chromaticity and an x value in the specified range by CIE chromaticity representation, or a red emission composition comprising the same phosphors but having a pigment adhered thereto. Furthermore, it is thus rendered possible to obtain a color picture tube, excellent in emission brightness color reproduction and beam current balance, by combination of a fluorescent film of a green emission component having an emission color in the specified range and a fluorescent film of a blue emission component having an emission color in the specified range with a fluorescent film of this red emission component.

What is claimed is:

1. A color picture tube comprising a face plate on which dot-shaped or stripe-shaped fluorescent films of blue, green and red emission components are respectively formed, characterized in that the fluorescent film of the red emission component is formed of a red emission composition comprising a mixture of an europium activated rare earth, oxide phosphor having an x value of 0.630 to 0.652 in CIE Chromaticity Representation and an europium activated rare earth oxysulfide phosphor having an x value of 0.652 to 0.674 in CIE Chromaticity Representation, said red emission composition having an x value of 0.647 to 0.662 in CIE Chromaticity Representation.

2. The color picture tube, as claimed in claim 1, wherein the red emission composition comprises a mixture of an europium activated rare earth, oxide phosphor having an europium concentration of 2.0 to 8.0 mole % and an europium activated rare earth oxysulfide phosphor having an europium concentration of 4.0 to 8.0 mole % in a mixing weight ratio of the rare earth oxide phosphor to the rare earth oxysulfide phosphor in a range of 85/15 to 25/75 , respectively.

3. The color picture tube, as claimed in claim 2, wherein the mixing weight ratio of the europium activated rare earth oxide phosphor to the europium activated rare earth oxysulfide phosphor is in a range of 50/50 to 70/30, respectively.

4. The color picture tube, as claimed in claim 1, wherein the red emission composition further comprises a red pigment.

5. The color picture tube, as claimed in claim 4, wherein the red emission composition comprises pigment-adhered phosphors obtained by adhering a red pigment respectively to the europium activated rare earth oxysulfide phosphor and europium activated rare earth oxide phosphor.

6. The color picture tube, as claimed in claim 4, claim 5 or claim 6, wherein the red pigment is iron oxide red.

7. The color picture tube, as claimed in claim 6, wherein the adhesion quantity of the iron oxide red is in a range of 0.05 to 0.70 weight %.

8. The color picture tube, as claimed in claim 4, wherein the red emission composition comprises a mixture of a red pigment-adhered europium activated rare earth oxide phosphor with an europium concentration of 2.0 to 8.0 mole % and a red pigment-adhered europium activated rare earth oxysulfide phosphor with an europium concentration of 3.5 to 8.0 mole % in a mixing weight ratio of the rare earth oxide phosphor to the rare earth oxysulfide phosphor in a range of 85/15 to 25/75, respectively.

9. The color picture tube, as claimed in claim 1, wherein the red emission colors of a green emission fluorescent film and a blue emission fluorescent film are respectively represented by x values of 0.200 to 0.330 and 0.145 to 0.155 in CIE chromaticity representation.

10. The color picture tube, as claimed in claim 1, wherein the red emission composition comprises an europium activated yttrium oxysulfide phosphor and an europium activated yttrium oxide phosphor with an emission intensity ratio of 0.2 to 3.0 at emission peaks of 626 nm and 611 nm.

11. The color picture tube, as claimed in claim 1, wherein the europium activated rare earth oxide phosphor is subjected to an insolubilization treatment of the surface thereof and fluorescent films of blue, green and red emission components are respectively formed by the slurry coating method.

12. The color picture tube, as claimed in claim 11, wherein the europium activated rare earth oxide phosphor is subjected to an insolubilization treatment by coating the phosphor surface with a hydrophilic insolubilizing agent.

13. The color picture tube, as claimed in claim 12, wherein the hydrophilic insolubilizing agent is at least one member selected from the group consisting of silicon type and zinc oxide aluminate type treating agents.

14. The color picture tube, as claimed in claim 12, wherein the hydrophilic insolubilizing agent is at least one member selected from the group consisting of acrylic resins and styrene-butadiene resins, to which a hydrophilic property has been imparted.

* * * * *